(12) United States Patent
Liu et al.

(10) Patent No.: US 7,765,325 B2
(45) Date of Patent: Jul. 27, 2010

(54) SIGNALING COMPRESSION/DECOMPRESSION WITH IMPROVED EFFICIENCY

(76) Inventors: Zhigang Liu, 320 Brushy Creek Trail, Coppell, TX (US) 75019; Sami Jutila, Tapiontie 3 B 15, Oulu (FI) 90570; Ilkka Pesonen, Tuohitorventie 6, Oulu (FI) 90630

( * ) Notice: Subject to any disclaimer, the term of this patent is extended or adjusted under 35 U.S.C. 154(b) by 1068 days.

(21) Appl. No.: 11/188,768

(22) Filed: Jul. 26, 2005

(65) Prior Publication Data

US 2006/0262812 A1 Nov. 23, 2006

Related U.S. Application Data

(60) Provisional application No. 60/681,450, filed on May 17, 2005.

(51) Int. Cl.
*G06F 15/16* (2006.01)
(52) U.S. Cl. ........................ 709/247; 709/230
(58) Field of Classification Search ................ 709/230, 709/247
See application file for complete search history.

(56) References Cited

U.S. PATENT DOCUMENTS

| 7,213,143 | B1 * | 5/2007 | Watson et ................. | 713/151 |
| 7,348,904 | B2 * | 3/2008 | Christoffersson et al. ... | 341/106 |
| 2004/0059835 | A1 * | 3/2004 | Liu et al. .................... | 709/247 |
| 2005/0144326 | A1 * | 6/2005 | Sugar et al. ................ | 709/247 |
| 2005/0172032 | A1 * | 8/2005 | Pessi .......................... | 709/246 |
| 2005/0185677 | A1 * | 8/2005 | Christoffersson et al. ... | 370/521 |
| 2007/0171907 | A1 * | 7/2007 | Mansutti et al. ............ | 370/389 |

FOREIGN PATENT DOCUMENTS

EP 1599009 11/2005

OTHER PUBLICATIONS

G. Camarillo, "Compressing the Session Initiation Protocol (SIP)", Feb. 2003, pp. 1-12.
A. Shacham (Cisco), R. Monsour (Hi/fn), R. Pereira (TimeStep), M. Thomas (AltaVista Internet), "IP Payload Compression Protocol (IPComp)", Dec. 1998, pp. 1-10.
SIP WG—G. Camarillo, et al. (Ericsson), "SigComp discovery for SIP", Feb. 21, 2002, pp. 1-7.
R. Price (Siemens/Roke Manor), C. Bormann (TZI/UNI Bremen), J. Christoffersson, et al. (Nokia), J. Rosenberg (dynamicsoft), "Signaling Compression (Sigcomp)", Jan. 2003, pp. 1-62.
Mats Nordberg, et al., "Improving SigComp performance through Extended Operations", Oct. 2003, pp. 3425-3427.
Communication and Examination Report for European Patent Application 06 765 429.3, dated Apr. 15, 2009.
Communication and Examination Report for European Patent Application 06 765 429.3, dated Apr. 15, 2009.

* cited by examiner

*Primary Examiner*—Phuoc Nguyen

(57) ABSTRACT

The present invention relates to a method of compressing or decompressing a signaling message in a packet data network, wherein a parameter information is provided in a header portion of a protocol message of the packet data network. The parameter information specifies at least one processing detail of a compression or decompression mechanism and is forwarded together with the protocol message through the packet data network to a compression or decompression function of the packet data network. The compression or decompression mechanism at the compression or decompression function is then set in accordance with the parameter information. Thereby, a better compression of the first or first few messages can be achieved, as the parameter information is directly available.

36 Claims, 2 Drawing Sheets

SIGNALING COMPRESSION/DECOMPRESSION WITH IMPROVED EFFICIENCY

FIELD OF THE INVENTION

The present invention relates to a method and apparatus for compressing or decompressing a signaling message in a packet data network.

BACKGROUND OF THE INVENTION

Many application protocols, like SIP (Session Initiation Protocol) or RTSP (Real-Time Streaming Protocol), used for multimedia communications are text-based and engineered for links having wide bandwidth. As a result, their messages have not been optimized in terms of size. For example, typical SIP messages range from a few hundred bytes up to two thousand bytes or more. SIP is defined by the IETF (Internet Engineering Task Force) in RFC (Request for Comment) 3261 and is an application-layer protocol used for (among other things) establishing, handling and releasing end-to-end multimedia sessions. With the planned usage of these protocols in wireless handsets as part of cellular networks, the large message size is problematic. With low-rate IP (Internet Protocol) connectivity the transmission delays are significant. Taking into account retransmissions and the multiplicity of messages that are required in some flows, at least call setup and feature invocation are adversely affected.

To eliminate this problem, a Signaling Compression (SigComp) architecture has been defined for robust, lossless compression of application messages. In terms of the OSI (Open System Interconnection) model, SigComp architecture can be interpreted as an enhancement to transport layer. Thus, SigComp provides the higher layer applications for both transmission and compression of the messages. SigComp is a protocol standardized in IETF which can compress application-layer protocol messages. In particular, it was developed to compress SIP messages which is used for session (call) setup and many other applications such as messaging. The main goal of SigComp is to reduce the size of SIP messages so that they can be transmitted with low latency over bandwidth limited links (e.g. cellular). Without SigComp, the transmission latency will lead to long call setup time that would not be acceptable to end users. SigComp details are defined in the following RFCs in IETF: RFC3320, RFC3321, RFC3322, RFC3485, and RFC3486.

Due to its usefulness in mobile communication, $3^{rd}$ Generation Partnership Project (3GPP) has recommended the use of SigComp at least for compressing SIP messages. Therefore, the future 3 G mobile terminals must support SigComp.

The transmitting side of the SigComp architecture comprises a compressor dispatcher, one or more compressors and a state handler. The compressor dispatcher serves as the interface from the application. The application supplies the compressor dispatcher with an application message and a compartment identifier (i.e. an identifier that is used for application-specific grouping of messages). The compressor dispatcher invokes a particular compressor, which returns a SigComp message to be forwarded to the remote endpoint. State handler stores and retrieves state information that is stored between SigComp messages in order to avoid the need to upload the data on a per-message basis.

The receiving side of the SigComp architecture comprises a decompressor dispatcher, a Universal Decompressor Virtual Machine (UDVM) (a virtual machine which performs decompression) and a state handler. The decompressor dispatcher serves as the interface towards the application. The decompressor dispatcher receives a SigComp message from the transport layer and invokes an instance of the UDVM, which decompresses the SigComp messages. The decompressor dispatcher then forwards the resulting decompressed message to the application, which may return a compartment identifier if it wishes to allow state to be saved for the message. During the decompression process the UDVM may invoke the state handler to access existing state or create new state.

SigComp messages are transmitted as data packet flow on the transport layer along with other application messages, e.g. uncompressed SIP and RTSP messages. The SigComp messages are identified with own five-bit delimiters, i.e. they start with 11111 bits and end with 0xFFFF bits in case of stream-based transport according to e.g. Transmit Control Protocol (TCP). End-marking is however not needed in message-based transport according to e.g. User Datagram Protocol (UDP). The transport layer data stream is directed to the decompressor dispatcher, which must be arranged to identify the SigComp messages for decompression and to pass the non-SigComp messages to a particular application client, like SIP stack or RTSP.

However, initial requests are not compressed, since according to RFC 3486 compression is not to be started until the next hop URI (Uniform Resource Identifier) includes the parameter ";comp=SigComp," and the SIP-URI of the outbound proxy does not include that parameter. The proxy address is discovered by a transmitting device during initial registration procedure and does not change afterwards.

SigComp has defined a few parameters such as version number and memory capacity that are supported by an endpoint. For SigComp to work between a message transmitter and receiver, they must agree on the values of those parameters. The current approach is that a SigComp receiver must support the minimum values of SigComp parameters that are defined for each application protocol, e.g. SIP in this case. The receiver may offer more than the minimum. In that case, the receiver can announce the parameter values in a SigComp feedback message sent back to the transmitter, as described for example in document US2005/0086327A1. This poses a few problems:

First, SigComp is not fast enough. When a transmitter sends the first message, it would be desirable to know if the receiver supports a newer version of SigComp or has more capacity than the minimum specified. Of course, the transmitter may wait for the SigComp feedback from the receiver. But that means the first message cannot be compressed in an optimal way. To make the problem even worse, there may be cases where the transmitter has to send more than one message before there is a message on the reverse direction. It means multiple messages—not just the first one—cannot be compressed optimally.

Second, implementation of SigComp is complicated. With the current SigComp announcement approach, it would require an implementation to do a "switch" (e.g. from SigComp version 1 to version 2 or from a small memory buffer to a larger one) after the first message in order to utilize the extra capacity for subsequent messages. Such a "switch" would add significant complexity to the implementation.

Third, SigComp does not work for asymmetric situation, where SigComp is applied on one signaling direction only. That is because the announcement mentioned above has to be carried as part of a SigComp message. Therefore, if SigComp is not applied on the other direction, no SigComp feedback can be sent back to the transmitter. In this respect, it is noted that some radio technologies are asymmetric, e.g. small bandwidth for uplink and large bandwidth for downlink. In that case, only SIP messages transmitted over uplink need to be compressed by SigComp.

Fourth, in SigComp, compression is made using any compression algorithm. The big idea in RFC 3220 is that decompression is always possible, no matter what compression algorithm was used. Decompression is done by using a virtual machine running a bytecode supplied by the endpoint who compresses. However, the size of the bytecode is several hundreds of bytes, so transmitting the bytecode via air interface leads to a reduced compression ratio. Quite often it may happen that there are so few messages (less than 50) compressed during the lifetime of a compression session (compartment life time in RFC 3320), so that using SigComp may actually make the total amount of transmitted bytes larger than without compression. It is noted that the bytecode is usually sent in both directions as both endpoints may choose the compression algorithm freely. Nowadays, sending the bytecode uplink and downlink requires a respective extra payload of 750 bytes.

In addition, the network has no way to effect what algorithm a terminal device uses in compression. It might use a very slow or inefficient algorithm. Or, an efficient algorithm my be used, which however consumes very much processing time and thus limits the number of users the network can serve.

Moreover, each terminal typically always uses the same bytecode and even terminals from the same manufacturer typically use exactly the same bytecode. Thus the same bytecode is sent via air-interface several times an hour, which is reducing the overall capacity and benefit of the compression.

An additional problem on the network side is that when a bytecode is received from many terminals, the network may need to calculate a SHA-1 value to get a state-id for the same bytecodes all the time. This generates unnecessary processing load in the network server and may actually limit the number of users it can serve.

On the other hand, if the network has stored a set of bytecodes, this may optimize the UDVM implementation so that the stored bytecodes can be processed very efficiently. For example if it is a known fact that for some bytecode decompresses using an LZ77 algorithm, network implementation for that bytecode could be such that virtual machine and bytecode is not used at all but decompression is done using more efficient standard methods, e.g. a decompression routine written in some general-purpose programming language. Thereby, much more clients could be served by one server as compared to running the bytecode in the virtual machine.

SUMMARY OF THE INVENTION

It is therefore an object of the present invention to provide a more effective signaling compression which at least alleviates the above problems.

This object is achieved by a method of compressing or decompressing a signaling message in a packet data network, said method comprising the steps of:
providing parameter information in a header portion of a protocol message of said packet data network, said parameter information specifying at least one processing detail of a compression or decompression mechanism;
forwarding said protocol message through said packet data network to a compression or decompression function of said packet data network; and setting said compression or decompression mechanism at said compression or decompression function in accordance with said parameter information.

Furthermore, the above object is achieved by an apparatus for processing a signaling message in a packet data network, said apparatus comprising:
means for extracting a parameter information from a header portion of a protocol message received from said packet data network, said parameter information specifying at least one processing detail of a compression or decompression mechanism; and
means for setting a compression or decompression function provided in said apparatus and used for compressing or decompressing said signaling message, in accordance with said extracted parameter information.

Additionally, the above object is achieved by an apparatus for processing a signaling message from a packet data network, said apparatus comprising:
means for adding a parameter information to a header portion of a protocol message of said packet data network, said parameter information specifying at least one processing detail of a compression or decompression mechanism; and
means for transmitting said protocol message with said added parameter information to said packet data network.

Accordingly, it is proposed to indicate the compression or decompression parameter information by a header portion of protocol message, e.g. at SIP level, so that a transmitter unit can determine compression parameter values of a receiver before sending the first message, or a receiver unit can directly determine decompression parameter values without any additional dedicated signaling.

Thereby, a better compression of the first or first few messages can be achieved. Moreover, compression implementation can be simplified, since there is no need to "switch" after learning of the compression parameter information, e.g. version or capacity, of the other endpoint.

As additional advantages, a quite simple signaling compression is provided which can be used on one direction only, and which can interoperate with existing specifications, e.g. RFC 3486.

Furthermore, an advertised capability information can be extended so that possibly already known bytecodes can be advertised, which leads to an improved compression ratio during negotiation phase and enables selection of a compression algorithm also for uplink direction. Moreover, this provides an opportunity to decode decompression algorithms more efficiently, as it is possible to decompress without using the virtual machine and without bytecode. Consequently, it is still possible to introduce new more developed (external) compression algorithms. If the new advertise parameter is added, the information about bytecode storage can be received also in cases of one-directional compressions.

In general, in case of an implementation at a transmission end, the apparatus may comprise a transmitter for compressing and transmitting the signaling message, wherein the received parameter information is a compression parameter information. Alternatively, the apparatus at the transmission end may transmit a decompression parameter information towards the reception end.

In case of an implementation at a reception end, the apparatus may comprise a receiver for receiving and decompressing said signaling message, wherein a received parameter information is a decompression parameter information.

Alternatively, the apparatus at the reception end may transmit a compression parameter information towards the transmission end.

The protocol message may be an application layer protocol message, such as for example a SIP message or a RTSP message. The parameter information may comprise at least one parameter of a SigComp architecture.

The protocol message may be a feedback message sent back to a transmitting end of said signaling message, in response to an initial request for communication.

Furthermore, the parameter information may be provided in at least one of a Uniform Resource Identifier or a Via-header of a SIP message. The parameter information may be added to the Uniform Resource Identifier at an intermediate server device of the packet data network. Additionally, the parameter information may be added to the Via-header at a client device of the packet data network. In particular, the parameter information may be added as a suffix to a parameter indicating use of the compression mechanism. As an alternative, the parameter information may be added as a data field separate from a parameter indicating use of the compression mechanism.

As an example, the parameter information may comprise a predetermined first character indicating the beginning of the parameter information. In addition, the parameter information may comprise at least one character followed by a respective integer number which indicates a corresponding value of a parameter represented by said at least one character.

More specifically but not essentially, the parameter information may specify at least one of a signaling compression version, a state memory size, a decompression memory size, a number of cycles per bit, and a logically available state.

Alternatively or additionally, the parameter information may specify a proprietary information of implementation of the compression or decompression function.

In a specific example for a decompression parameter, the parameter information may comprise at least one bytecode to be used by a virtual decompression machine. This at least one bytecode can be advertised in the packet data network. It can be added as a via parameter to a via-header of a SIP message. The via parameter can be derived from a bytecode state identity.

Furthermore, the at least one bytecode can be modified or replaced in a response message transmitted in response to the protocol message, if the at least one bytecode is not supported. Then, the modified or replaced bytecode is transmitted under a different parameter name. Optionally, the at least one bytecode can be stored at a reception end. As an example, the at last one bytecode can be stored in a Subscriber Identity Module (SIM) of a terminal device. The storing can be performed based on a priority allocated to the at least one bytecode, so that deletion of old bytecodes can be better controlled.

Alternatively or additionally, the least one bytecode can be added to a contact header of a Session Initiation Protocol Register message.

Further advantageous modifications are defined in the dependent claims.

BRIEF DESCRIPTION OF THE DRAWINGS

The present invention will now be described based on preferred embodiments with reference to the accompanying drawings in which.

DESCRIPTION OF THE PREFERRED EMBODIMENT

In the following, the preferred embodiments of the present invention will be described in connection with a SigComp signaling compression scheme as defined in RFC 3320.

In section 3.3. of RFC 3320, five SigComp parameters are described. They affect how a SigComp receiver processes a received SigComp message. In order to have successful SigComp operations, a SigComp transmitter needs to know the values of these parameters of the receiver. The five SigComp parameters are used to define a decompression memory size (decompression_memory_size), a state memory size (state_memory_size), the number of cycles per bit (cycles_per_bit), a compression version (SigComp_version), and a locally available state (a set containing 0 or more state items), respectively.

Figure 1:
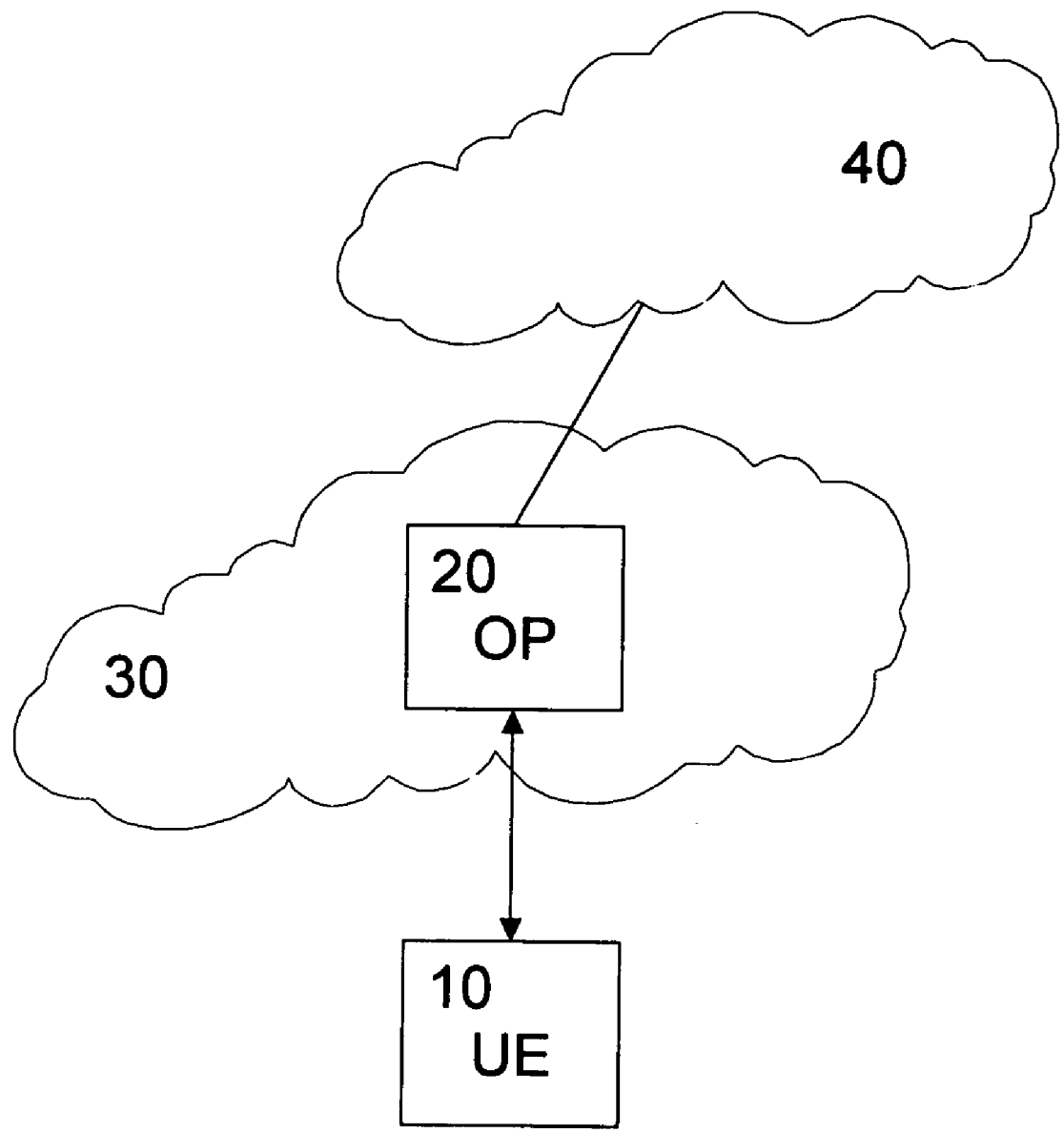
FIG. 1 shows a schematic diagram of a network environment according to the preferred embodiments.

FIG. 1 shows a schematic diagram of a network environment according to the preferred embodiment. The SIP user agent (not shown) provided in a user equipment (UE) 10 or other terminal device exchanges SIP messages via a radio access network (not shown) with a SIP outbound proxy server 20 (i.e. the first hop proxy server) of a service network 30, such as a Proxy Call State Control Function (P-CSCF) of an IP Multimedia Subsystem, to get access to a service of an IP based network 40, e.g. the Internet. First, the UE 10 and the outbound proxy 20 exchange a sequence of messages resulting in establishing a security association between the UE 10 and the outbound proxy 20. These messages are sent uncompressed.

According to the preferred embodiments, a mechanism is introduced to indicate at least one of the above SigComp parameters at SIP level.

In the first preferred embodiment, the above mechanism may have two components or options:

First, the SigComp parameters can be indicated as part of a SIP URI. A SIP URI identifies a SIP communications resource (e.g. a user or a service) that can be contacted. For example, a SIP client sends SIP requests to a SIP server identified by a SIP URI. Including SigComp parameters in a SIP URI automatically declares the SigComp capabilities of the SIP entity identified by the URI. This allows a transmitter to apply SigComp in the most optimal way on the very first SIP message it sends.

Second, the SigComp parameters can be indicated as part of a Via-header field. The Via-header field is carried in a SIP request. It indicates where a SIP response to the request should be sent. By including the SigComp parameters in the Via-header field, the transmitter of the SIP request can announce its SigComp capacity to its peer so that the peer can apply SigComp in the most optimal way when sending back the first response.

It is noted that both of the above options may be used alternatively or as parallel components. For example, the first component allows a (proxy) server to announce its SigComp parameters in its URI so that a client can compress the first request message sent to the server with optimal SigComp configurations. The second component is useful for the same client to declare its own SigComp capacity (which may not be known to the server in advance) in the via-header field of the request. When the server sends back a response to the request, it can already compress the response according to the Sig-Comp capacity of the client.

As to the format of the SigComp parameters, there could be many different variations in implementation. But they may basically fall into the following two options:

Option 1:

SigComp parameters are added as suffix to the "comp=sigcomp" as defined in RFC 3486, for both URI and Via-header field. For example:
   sip:alice@Atlanta.com;comp=sigcomp_VnSnDnCn_Lx
   via: SIP/2.0/UDP pc33.Atlanta.com; branch=z9hG4bK776asdhds;
   comp=sigcomp_VnSnDnCn_Lx Below, the format of this option is explained:
  The first "_" character after string "sigcomp" indicates the beginning of SigComp parameters.
  Character "V", "S", "D", "C", and "L" stand for SigComp_version, state_memory size, decompression memory size, cycles_per-bit, and locally available state, respectively.
  Character "V" is followed by an integer that indicates SigComp_version. The integer can be one digit or more. For example, "V1" means SigComp_version=1 and "V10" means SigComp_version=10.
  Similarly, each of character "D", "S" and "C" is followed by an integer (1 or more digits) that indicates the corresponding value. However, the face value of the integer should be interpreted as shown below, which covers a superset of the possible values as defined in section 3.3.1 of RFC 3320. The purpose of this is to make the SigComp parameter string as short as possible.
  Let n denote the face value of the integer.
  After "S": state_memory_size=0 bytes, if n equals 0; else, state_memory_size=$2^{(10+n)}$ bytes.
  After "D": same as above, except that n cannot be 0 (since 0 is not a valid decompression_memory_size).
  After "C": cycles_per_bit=$2^n$.
  Note that the order between "V", "S", "D", "C" can be arbitrary. For example, "V1 S2D3C4" is equivalent to "V1 D3C4S2". Both means SigComp_version=1, state_memory_size=4 KB, decompression_memory_size=8 KB, and cycles_per_bit=16. In addition, some or all of them can be omitted if the corresponding parameters have the default values as defined by SigComp related specification. For instance, "S3" indicates state_memory_size=8 KB and all the other SigComp parameter values are the same as default.
  The string after "_L" is the hexadecimal representation of the state identifier (either complete or partial) of a locally available state. For example, "L4B7ECDE7DA49" indicates the SIP entity has a locally available state with partial state identifier (the most significant six bytes) as 0x4B7ECDE7DA49. Refer to section 3.3.3 and 7.2 of RFC 3320 for details. This allows the transmitter to use the state item if it is aware of the content of the state.
  Note: there could be zero or multiple instances of "_Lx". In particular, omission of "_Lx" element means the SIP entity does not have any locally available states other than the default ones specified by SigComp standards.
  Note: The "_" preceding "Lx" is needed for parsing purpose, since "D" and "C" (the compacted parameter names) may also appear in "Lx" as in the example shown above.

Option 2:

SigComp parameters are added as a data field separate from the "comp=" parameter. For example:
   sip:alice@Atlanta.com;comp=sigcomp;comp-param=VnSnDnCn_Lx
   via: SIP/2.0/UDP pc33.Atlanta.com; branch=z9hG4bK776asdhds;comp=sigcomp;comp-param=VnSnDnCn_Lx Except the separation, the format of SigComp parameter string may be the same as in Option 1. The advantage of this option is the interoperability with RFC 3486. Namely, if a SIP endpoint implementing this invention sends data field as above to another SIP endpoint that implements only RFC 3486, the latter can still conclude that the former supports SigComp from the "comp=sigcomp" field. The "comp-param=" field will then be ignored by the receiver. The only consequence is that the receiver does not know the extra capacity (more than the default) of the transmitter, which is the case anyway without the proposed enhancement. In addition, this option—combined with RFC 3486—can be used as a generic framework for indicating compression features other than SigComp. Namely, the "comp=" field as RFC RFC 3486 indicates the compression algorithm, whereas the proposed "comp-param" may indicate additional information (e.g. compression parameters) of that algorithm. Option 2 requires an additional field in a SIP URI and Via-header. This also means that more bytes (i.e. "comp-param=") are required compared to option 1. However, option 2 provides the advantage of interoperability and generality.

It is noted that the mechanism can also be extended for a SIP endpoint to indicate proprietary information about its SigComp implementation. One simple way is to add "_Xs" to the SigComp parameter field, where "_" is a delimiter, "X" indicates it's a proprietary element, and "s" represents a text string that carries the proprietary information. A receiver can ignore the "X" field if it does not understand its meaning.

According to the second preferred embodiment, the idea is simply to store one or more bytecodes in the terminal device and also on the network side, and to provide methods for advertising available bytecodes so that they do not need to be transmitted via air-interface over and over again.

In a first example which relates to a terminal initiated compression session, the terminal device may start a compression session (i.e. compartment, for example with the SIP methods REGISTER or INVITE) with the network by advertising that it knows already the bytecode (or bytecodes), which is most likely to be used by network for compression. Then, when the network starts compression in downlink direction, it does not need to upload the bytecode at all, if it wants to use the same bytecode as the terminal device has advertised.

Upon receiving any bytecode from the network, the terminal device may store the bytecode also in permanent memory possibly replacing some or one of the old ones. Thus, it is possible to update algorithms dynamically as the compression algorithms evolve and there is no need to fix or agree the algorithms beforehand as was the case with prior-art methods.

The network may also advertise the bytecode(s) most likely used by the terminal either in an uncompressed response when the terminal device has advertised the bytecode it knows or in a compressed message by using the well-known method of advertising the locally available states in returned parameters (see RFC 3320 for details). In either case, if the terminal chooses to use the bytecode the network advertises, it does not need to send the bytecode to the network.

In a second example which relates to a network initiated compression session, there might be differences how to handle new received bytecodes from terminal devices. As it might be a security or resource issue to store some code that has not officially been validated by terminal manufacturers to be a correct one, it might be safer not to store bytecodes in a permanent memory.

It is noted that the idea underlying the second preferred embodiment also supports concepts of agreeing bytecodes with network operators and terminal manufacturers as well as the mandatory bytecodes etc. Some of the bytecodes in a terminal device may be in a memory which will never be overwritten or replaced with new algorithms. In case of a mandatory algorithm, the mandatory algorithm may not need to be advertised unless for some specific reason the network wishes that the terminal device uses specifically that algorithm (and that bytecode) and no other algorithm.

The SigComp negotiation method has been described in RFC 3486. It uses ;comp=sigcomp to indicate the capability of sigcomp decompression. One approach is to extend the capability information so that the possibly already known bytecodes can be advertised.

When a request is sent, the Via: header includes the ;comp=sigcomp parameter whenever there is a capability and willingness to decompress. It is easy to extend this for cases when there is not yet a compression session. For those cases a new via-parameter is added, <compression-bytecodes>. This new bc-parameter could be formatted for example as follows:

;bc=bc_state-id-in-hexadecimal.

For instance if the bytecode state id would be 0x760x940x340xA3 . . . 0x6C, then the bc-parameter could have a value:

;bc=769434A3 . . . 6C

The length of the state-id may be 20 bytes, so that there would be 40 bytes of hexdigits. However, it could be shortened so that at least a minimum access length of bytes would be needed in the parameter. Hence, in case of a minimum access length of 6 bytes, at least 12 hexadecimal digits would be needed in the bc-parameter. It is also possible (but not necessarily useful) to inform state-identifiers for more than one byte code in priority order.

If a request with this new bc-parameter is received by a terminal device, such as a mobile terminal for example, it has to use the bytecode from the list if it knows it and not to select any other bytecode. This makes it possible for the network to balance the load of the servers, as it can select the compression algorithm used for both directions (uplink and downlink).

If the bc-parameter contains an empty list of bytecodes, this means that there are no bytecodes stored or preferred by the transmitting entity which has sent the bc-parameter. However, the transmitting entity knows this mechanism and wants the other end to advertise the bytecodes it knows or prefers.

Upon receiving the bc-parameter, it is known that the stored bytecode mechanism is supported by other end. Then, when sending response it is possible to modify the via: header in response so that the supported bytecodes can be advertised. However, a different name should be used for that parameter, as otherwise it would not be possible to differentiate whether the other end just copied the via: header back to us or whether it really knows the byte code advertising method. In response the bc-parameter contents received can be dropped or disregarded and replaced them by a bc_resp: parameter. The coding of the bc_resp-parameter may be the same as for the bc-parameter.

Another way to provide supported bytecodes is to use the returned parameters mechanism described in RFC 3320 in the compressed message. However, if the message is not compressed then this new bc_resp-parameter is the only way to advertise the known bytecode(s).

Again, the terminal device must use the bytecodes advertised in the bc_resp parameter, if it knows the bytecode and may not select another bytecode in order to make it possible for network to select compression also for uplink direction.

Upon receiving the bc-parameter, it is known that the stored bytecode mechanism is supported by other end. Then, when sending response it is possible to modify the via-header in response so that the supported bytecodes can be advertised. However, a different name should be used for that parameter, as otherwise it would not be possible to differentiate whether the other end just copied the via-header back or whether it really knows the byte code advertising method. In response the bc-parameter contents received can be dropped or disregarded and replaced them by a bc_resp-parameter. The coding of the bc_resp-parameter may be the same as for the bc-parameter.

Figure 2:
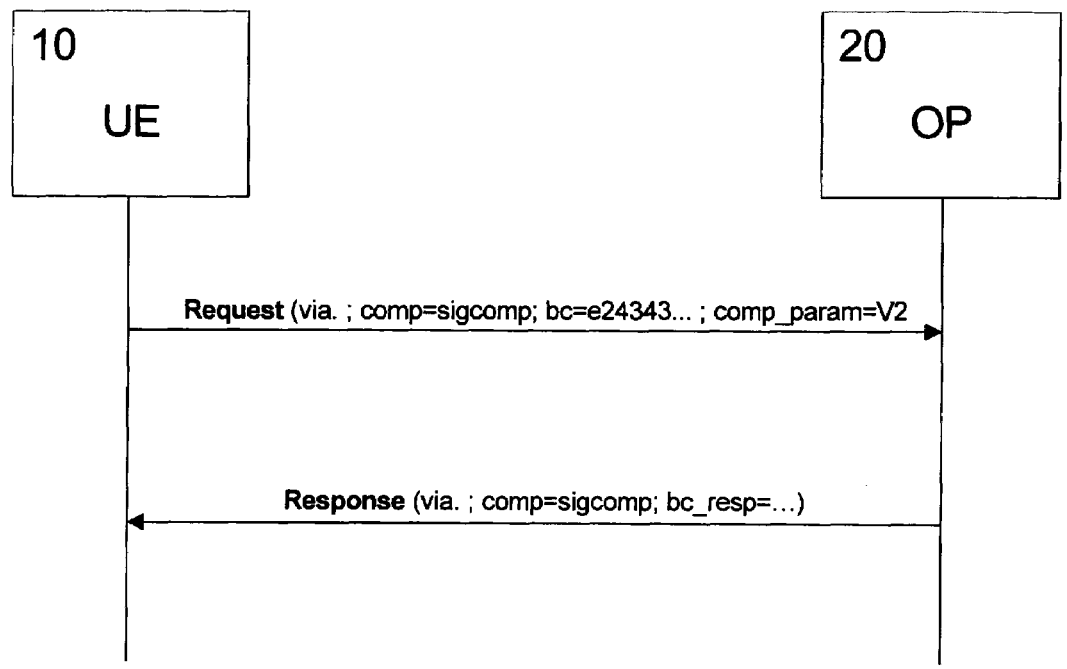
FIG. 2 shows a schematic signaling diagram of a via-header modification according to the second preferred embodiment.

FIG. 2 shows a schematic signaling diagram of a via-header modification according to the second preferred embodiment. A request with a via-header comprising "comp=sigcomp;bc=e24343 . . . ; comp_param=V2" is used by the UE 10 of FIG. 1 to advertise bytecode likely to be used by the outbound proxy 20, informing that sigcomp version 2 is supported. In the response of the outbound proxy 20, the via-header comprises "comp=sigcom;bc_resp= . . . ". As the via parameter is modified, the UE 19 knows that the outbound proxy 20 actually understood the parameter. This mechanism is needed in cases where the response is sent uncompressed. Sometimes, it might be useful not to compress every response or sometimes it might be useful to compress in one direction. In this case, the network did not want to compress but it wishes that the terminal compresses its messages. The same kind of via-header modification might be useful also for other sigcomp parameters, e.g. "comp_param_resp=V2". So, a two-way-negotiation is achieved in a simple manner.

That is, the modification of the via-header in the response allows exchange of sigcomp parameters in both directions. Of course in case the SigComp compression is used in the response, the sigcomp parameter passing in via-header is not necessary anymore, as a feedback mechanism can then be used. Still the bc-headers could be used even during SigComp to change the algorithm the UE 10 uses in compression. For instance the UE 10 may first use a DEFLATE algorithm, and after a while the network notices that some other algorithm would work better. It could then advertise some other bytecode in the via-header. The network might have master control of compression algorithms in both directions.

For bytecode storing there are a lot of possible solutions. One or some bytecodes may be stored permanently in terminal memory (for instance mandatory or operator preferred bytecodes). The SIM (Subscriber Identity Module) card might be one storage place where either the bytecode id together with its parameters (such as length, minimum access length etc.) would be stored indicating that this bytecode shall not be removed from the terminal memory. The SIM card could also store the whole bytecode. The bytecodes can be updated via well-known mechanism such as SMS (Short Messaging Service) download etc.

When the terminal device receives a new bytecode in a SigComp signaling it normally stores the bytecode also in its terminal memory so that it can be advertised next time the terminal device is powered on. As the terminal device has only a limited amount of storage capacity, some priority algorithms may be needed in case storing this new bytecode requires deleting some old bytecodes from memory. Also it might be possible that the bytecode is not stored in the terminal memory in case there are only bytecodes with higher priority in the memory. The high priority bytecodes might include the ones indicated by the SIM card as high priority bytecodes, the ones that are linked to some SIP settings as preferred bytecode, etc. The priority mechanism can be implemented in any of the various known methods.

For the network side, a feasible solution may be that mobile terminal manufacturers provide information about the bytecodes used in their terminals (at least the state identifier) and then the network can either store those permanently somewhere or choose any other strategy to validate that no unnecessary storage is needed for bytecodes. Any suitable mechanisms can be used to provide the information of the terminal manufacturers and to provide ways how and/or when to store bytecodes. Probably, however, the strategy for storing new bytecodes is different from the terminal strategy.

If the terminal device has stored several bytecodes in its memory, it is not useful to advertise all of them in ;bc or ;bc_resp fields. A simple strategy is to advertise the last one used in the compression. More sophisticated strategies include remembering what bytecode was used for each endpoint or linking the bytecodes to connection settings. Again the SIM may contain information about the preferred bytecode etc. It is also possible to advertise several bytecodes but that should be handled with care, as it reduces compression ratio if long advertisement messages are processed.

For the network side, the registrar might have information about the bytecode used currently by a user. This would require adding this information to the Contact: header provided in the REGISTER message. Again, the network might also have some other mechanisms to select the bytecodes it advertises. In some cases, when the network wants all users to select some specific bytecode, the selection is simple. Only that one is advertised, so that it is quite easy to calculate the load effect of each user for decompression.

As explained so far, sigcomp parameters and information about stored bytecodes can be delivered. However, in case of one-directional compression, it would be useful if the returned feedback could also be sent in via-headers.

Figure 3:
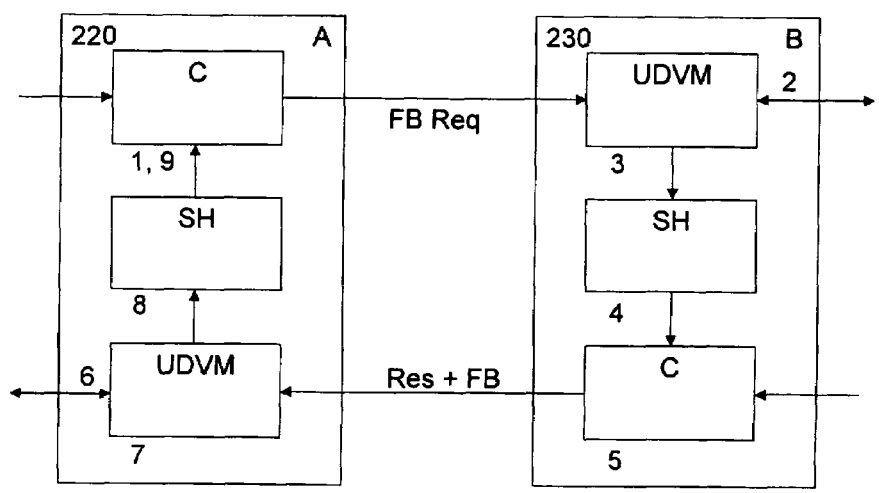
FIG. 3 shows a schematic signaling diagram of a procedure for transmission of feedback data according to the second preferred embodiment.

FIG. 3 shows a schematic signaling diagram of a procedure for transmission of feedback data between a first endpoint A 220 and a second endpoint B 230. If compression is only one-way, feedback is not delivered to endpoint A 220, because the feedback data are delivered in compressed messages.

According to FIG. 3, a compressor C at endpoint A 220 sends a sigcomp message requesting feedback to an UDVM at endpoint B 230 (step 1). The UDVM derives compression information (step 2) and controls the compressor C of the endpoint B 230 via the state handler SH, so as to generate a response with a feedback information (steps 3 and 4). By adding feedback to the via-header, the compression efficiency can be improved. The compressor C of endpoint B 230 in FIG. 2 would not actually be a compressor, as it would not generate a Sigcomp message, but send an uncompressed message where the via-header includes a new parameter "returned-feedback= . . . ;" if it finds a compartment for endpoint A 220 and feedback for that endpoint (step 5). When the UDVM of the endpoint A 220 receives the via-header with this new parameter (step 7), it finds a matching compartment (if possible) (step 6) and as it is passed to compressor C via the state handler SH in the endpoint A 220 it is possible to use more advanced compression algorithms at the compressor C of the endpoint A 220 (step 9), for instance dynamic compression.

It is however noted that one-directional compression is also possible if compressing some data would actually extend the message, e.g., compressing already compressed data, or data that is not ideal for the used compression algorithm, or for instance during heavy load situations when compression would eat too much resources and is temporarily deactivated.

So it might be just some messages that are not compressed but still feedback can be delivered to the compressor at the other endpoint.

This returned-feedback could also be part of sigcomp-params in the via-header, suc as " . . . comp_param=Fnnnn", as well as another way to advertise "bytecode . . . comp_param=B . . . ".

In general, the effect on overall SIP message size should however be minimized. Most of time, the proposed enhanced via-headers do not need to be added. Ideally they are needed just before SigComp compression is started, e.g. on initial REGISTER messages only. Thus, the proposed extra fields can be dispensed with in most of messages of the sigcomp negotiation with some exceptions. As one exception, a bc-header may be added by the network if it wants to change the compression algorithm the terminal uses. As another exception, a feedback header is added when feedback is sent in an uncompressed message, as explained above in connection with FIG. 3. As a further exception, if a compartment for a remote endpoint was destroyed for some reason, the sigcomp negotiation is restarted. This may be detected also by a NACK mechanism.

Some of the above parameters could be part of the contact information in the REGISTER message. They be part of the URI or a separate header-field in the REGISTER message.

In summary, a method and apparatus for compressing or decompressing a signaling message in a packet data network have been described, wherein a parameter information is provided in a header portion of a protocol message of the packet data network. The parameter information specifies at least one processing detail of a compression or decompression mechanism and is forwarded together with the protocol message through the packet data network to a compression or decompression function of the packet data network. The compression or decompression mechanism at the compression or decompression function is then set in accordance with the parameter information. Thereby, a better compression of the first or first few messages can be achieved, as the parameter information is directly available.

Furthermore, it is to be noted that the present invention is not restricted to the above preferred embodiment and can be implemented in any packet data network, where compression or decompression parameters have to be exchanged. The parameter information may define any kind if parameter and my be signaled or advertised by using any kind of header portion suitable for the underlying purpose. The preferred embodiments may thus vary within the scope of the attached claims.

The invention claimed is:

1. A method of communicating in a packet data network, said method comprising:

receiving an application layer protocol message at an endpoint in a packet data network, wherein the application layer protocol message comprises a Session Initiation Protocol message and includes parameter information, and further wherein the parameter information specifies at least one processing detail of a compression or decompression mechanism, wherein the at least one processing detail comprises at least one bytecode that is provided in at least one of a Via-header or a Contact header of the application layer protocol message; and setting the compression or decompression mechanism in accordance with the parameter information.

2. A method according to claim 1, wherein the at least one processing detail comprises at least one parameter of a SigComp architecture.

3. A method according to claim 1, wherein the protocol message is a feedback message sent in response to an initial request for communication.

4. A method according to claim 1, wherein the at least one processing detail is added to a Uniform Resource Identifier at an intermediate server device of the packet data network.

5. A method according to claim 1, wherein the at least one processing detail is added to Via-header at a client device.

6. A method according to claim 1, further comprising adding the at least one processing detail as a suffix to a parameter in the Via-header or the Contact header of the application layer protocol message, wherein the parameter indicates use of the compression or decompression mechanism.

7. A method according to claim 6, wherein the parameter information comprises a predetermined first character indicating a beginning of the at least one processing detail.

8. A method according to claim 7, wherein the at least one processing detail comprises at least one character followed by a respective integer number which indicates a corresponding value of a parameter represented by the at least one character.

9. A method according to claim 8, wherein the at least one processing detail specifies at least one of a signaling compression version, a state memory size, a decompression memory size, a number of cycles per bit, and a logically available state.

10. A method according to claim 8, wherein the at least one processing detail specifies a proprietary information regarding implementation of the compression or decompression mechanism.

11. A method according to claim 1, wherein the at least one processing detail is added as a data field in the Via-header or the Contact header of the application layer protocol message, wherein the data field is separate from a parameter indicating use of the compression or decompression mechanism.

12. A method according to claim 1, wherein the at least one bytecode is to be used by a virtual decompression machine.

13. A method according to claim 1, further comprising advertising the at least one bytecode in the packet data network.

14. A method according to claim 1, further comprising adding the at least one bytecode as a via parameter to the Via-header of the Session Initiation Protocol message.

15. A method according to claim 14, wherein the via parameter is derived from a bytecode state identity.

16. A method according to claim 1, wherein the at least one bytecode is modified or replaced in a response message transmitted in response to the application layer protocol message, if the at least one bytecode is not supported.

17. A method according to claim 16, wherein the modified or replaced bytecode includes a parameter name that differs from an original parameter name used in the application layer protocol message.

18. A method according to claim 1, further comprising storing the at least one bytecode.

19. A method according to claim 18, wherein the at least one bytecode is stored in a Subscriber Identity Module.

20. A method according to claim 18, wherein the storing is performed based on a priority allocated to the at least one bytecode.

21. A method according to claim 1, wherein the application layer protocol message comprises a Session Initiation Protocol Register message, and further comprising adding said at least one bytecode to the contact header of the Session Initiation Protocol Register message.

22. An apparatus for processing signaling in a packet data network, said apparatus comprising:
means for receiving an application layer protocol message, wherein the application layer protocol message comprises a Session Initiation Protocol message;
means for extracting parameter information from a header portion of the application layer protocol message, the parameter information specifying at least one processing detail of a compression mechanism comprising at least one bytecode, wherein the at least one bytecode is provided in at least one of a Via-header or a Contact header of the application layer protocol message; and
means for setting the compression mechanism such that the compression mechanism is configured to compress a response message to the application layer protocol message, wherein the compression mechanism is set in accordance with the at least one processing detail of the compression mechanism.

23. An apparatus according to claim 22, further comprising transmitting means for transmitting the response message, and wherein the parameter information comprises compression parameter information.

24. An apparatus according to claim 22, further comprising means for setting a decompression mechanism for decompressing said application layer protocol message in accordance with the at least one bytecode.

25. An apparatus according to claim 22, wherein the at least one bytecode is to be used by a virtual decompression machine to decompress the application layer protocol message.

26. An apparatus according to claim 22, further comprising means for adding the at least one processing detail as a suffix to a parameter in the Via-header or the Contact header of the application layer protocol message, wherein the parameter indicates use of the compression mechanism or decompression machine.

27. An apparatus according to claim 26, wherein the at least one processing detail is added as a data field in the Via-header or the Contact header of the application layer protocol message, wherein the data field is separate from a parameter indicating use of the compression mechanism or decompression machine.

28. An apparatus according to claim 26, wherein the parameter information comprises a predetermined first character indicating a beginning of the at least one processing detail.

29. An apparatus according to claim 28, wherein the at least one processing detail comprises at least one character followed by a respective integer number which indicates a corresponding value of a parameter represented by the at least one character.

30. An apparatus according to claim 22, further comprising advertising the at least one bytecode in the packet data network.

31. An apparatus according to claim 22, further comprising adding said at least one bytecode as a via parameter to the Via-header of the Session Initiation Protocol message.

32. An apparatus according to claim 31, wherein the via parameter is derived from a bytecode state identity.

33. An apparatus according to claim 22, wherein the at least one bytecode is modified or replaced in a response message transmitted in response to the application layer protocol message, if the at least one bytecode is not supported.

34. An apparatus for processing a signaling message from a packet data network, said apparatus comprising:
means for adding parameter information to a header portion of an application layer protocol message, wherein the application layer protocol message comprises a Session Initiation Protocol message, the parameter information comprising decompression parameter information comprising at least one bytecode, wherein the at least one bytecode is provided in at least one of a Via-header or a Contact header of the application layer protocol message; and means for transmitting said application layer protocol message with the added parameter information to an endpoint in a packet data network.

35. An apparatus according to claim 34, wherein the endpoint comprises a terminal device or a proxy server.

36. An apparatus according to claim 34, wherein the at least one bytecode is to be used by a virtual decompression machine.

\* \* \* \* \*